(12) United States Patent
Suumen et al.

(10) Patent No.: US 10,814,711 B2
(45) Date of Patent: Oct. 27, 2020

(54) ELECTRIC VEHICLE

(71) Applicant: MAZDA MOTOR CORPORATION, Hiroshima (JP)

(72) Inventors: Hiroaki Suumen, Hiroshima (JP); Masaki Aoyama, Hiroshima (JP); Yoshiaki Noguchi, Hiroshima (JP); Yusuke Oki, Iwakuni (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/475,930

(22) PCT Filed: Jan. 9, 2018

(86) PCT No.: PCT/JP2018/000155
§ 371 (c)(1),
(2) Date: Jul. 3, 2019

(87) PCT Pub. No.: WO2018/131552
PCT Pub. Date: Jul. 19, 2018

(65) Prior Publication Data
US 2019/0344650 A1    Nov. 14, 2019

(30) Foreign Application Priority Data

Jan. 16, 2017   (JP) ................. 2017-005386

(51) Int. Cl.
*B60K 1/00*    (2006.01)
*B60K 1/04*    (2019.01)
(Continued)

(52) U.S. Cl.
CPC ................. *B60K 1/04* (2013.01); *B60K 1/00* (2013.01); *B62D 21/02* (2013.01); *B62D 25/082* (2013.01)

(58) Field of Classification Search
CPC ...... B62D 25/20; B62D 25/08; B62D 25/082; B62D 25/085; B62D 21/02; B62D 21/03;
(Continued)

(56) References Cited

U.S. PATENT DOCUMENTS 4,560,027 A * 12/1985 Murakami ............... B60K 5/12
                                                    180/291
4,564,082 A *  1/1986 Takehara ................. B60K 5/04
                                                    180/291
(Continued)

FOREIGN PATENT DOCUMENTS

DE    102009040896 A1    3/2011
JP    H8-310252 A       11/1996
(Continued)

OTHER PUBLICATIONS

International Search Report issued in PCT/JP2018/000155; dated Mar. 13, 2018.

*Primary Examiner* — Steve Clemmons
(74) *Attorney, Agent, or Firm* — Studebaker & Brackett PC

(57) ABSTRACT

At least one of a pair of right and left motor unit support systems for mounting and supporting a motor unit (71) on a cross member (80) is fastened and fixed to an upper part of the motor unit (71) by a first shaft-like fastening member (a first bolt (101)). An axial direction of the first shaft-like fastening member (the first bolt (101)) is the same as a vehicle longitudinal direction in a state in which the at least one of the motor unit support systems is fastened and fixed to the upper part of the motor unit (72).

3 Claims, 8 Drawing Sheets

(51) Int. Cl.
*B62D 21/02* (2006.01)
*B62D 25/08* (2006.01)

(58) Field of Classification Search
CPC ........ B62D 21/11; B62D 21/155; B60K 1/00;
B60K 5/12; B60K 5/1216; B60K 5/1208;
B60K 2001/001
See application file for complete search history.

(56) References Cited

U.S. PATENT DOCUMENTS

| | | | |
|---|---|---|---|
| 8,511,416 B2* | 8/2013 | Hiruma | B60K 1/00 |
| | | | 180/291 |
| 8,720,636 B2* | 5/2014 | Akoum | B60K 1/00 |
| | | | 180/299 |
| 9,623,909 B1* | 4/2017 | Hirano | B62D 21/11 |
| 2006/0255515 A1 | 11/2006 | Ohta et al. | |
| 2008/0078603 A1 | 4/2008 | Taji et al. | |
| 2010/0101885 A1 | 4/2010 | Nozaki et al. | |
| 2014/0311812 A1 | 10/2014 | Kambayashi | |

FOREIGN PATENT DOCUMENTS

| | | |
|---|---|---|
| JP | 2005-96676 A | 4/2005 |
| JP | 2008-81010 A | 4/2008 |
| JP | 2009-061914 A | 3/2009 |
| JP | 2013-95152 A | 5/2013 |

\* cited by examiner

RIGHT ←→ LEFT

ELECTRIC VEHICLE

TECHNICAL FIELD

Disclosed herein is an electric motor vehicle including a motor unit which is disposed between a pair of right and left side frames such that a motor output shaft thereof extends along a width of the vehicle, and which serves as a power source for driving right and left wheels.

BACKGROUND ART

An electric motor vehicle including a motor unit which is disposed between a pair of right and left side frames such that a motor output shaft thereof extends along a width of the vehicle, and which serves as a power source for driving right and left wheels, has been known.

Patent Document 1 discloses an electric motor vehicle including: a cross member disposed above a motor unit and extending along a width of the vehicle; and a motor mount for mounting and supporting the motor unit on the cross member.

CITATION LIST

Patent Document

PATENT DOCUMENT 1: Japanese Unexamined Patent Publication No. 2013-95152

SUMMARY OF THE INVENTION

Technical Problems

In the vehicle described above, what is called "slip grip" in which wheels grip the ground after idling may occur. When the wheels grip the ground, a reaction load is input from the wheels to the motor unit.

In a case of the electric motor vehicle, such as one disclosed in Patent Document 1, in which the motor unit is mounted on and supported by the cross member via a motor unit support system, the motor unit needs to be still connected to the cross member via the motor unit support system even after receipt of the reaction load. To achieve this connection, an improvement in the attachment rigidity of the motor unit support system to the motor unit is particularly necessary. In a case of the electric motor vehicle, such as one disclosed in Patent Document 1, in which the motor unit is disposed such that the motor output shaft extends along the width of the vehicle, the reaction load acts in the vehicle longitudinal direction. It is therefore particularly necessary to improve the attachment rigidity of the motor unit support system to the motor unit against the reaction load acting in the vehicle longitudinal direction.

On the other hand, since other in-vehicle components exist around the motor, an increase in the size of the motor unit support system is not desired to improve the attachment rigidity of the motor unit support system to the motor unit.

It is therefore an object of the present disclosure to improve the attachment rigidity of a motor unit support system to a motor unit, where the motor unit is mounted on and supported by a cross member disposed above the motor unit via the motor unit support systems.

Solution to the Problems

In order to solve the problems, the present disclosure is directed to an electric motor vehicle including: a motor unit which is disposed between a pair of right and left side frames such that a motor output shaft thereof extends along a width of the vehicle, and which serves as a power source for driving right and left wheels; a cross member disposed above the motor unit, and fixed to the pair of right and left side frames to extend along the width of the vehicle; and a pair of right and left motor unit support systems for mounting and supporting the motor unit on the cross member. Each of the pair of right and left motor unit support systems includes: a fixed part fixed to the motor unit; and a mounting shaft connected to the fixed part via a mounting bracket integrally formed with the fixed part, and the mounting shaft being fixed to the cross member. The fixed part of at least one of the pair of right and left motor unit support systems is fastened and fixed to an upper part of the motor unit by a first shaft-like fastening member. An axial direction of the first shaft-like fastening member is the same as a vehicle longitudinal direction in a state in which the fixed part of the at least one of the motor unit support systems is fastened and fixed to the upper part of the motor unit.

This configuration improves the attachment rigidity of the motor unit support systems to the motor unit. Specifically, the motor unit is disposed so that the motor output shaft extends along the width of the vehicle. Thus, at the occurrence of slip grip, a relatively large reaction load is input to the motor unit in the vehicle longitudinal direction. However, the fixed part of at least one of the pair of motor unit support systems is fastened and fixed to the upper part of the motor unit by the first shaft-like fastening member. The axial direction of the first shaft-like fastening member is the same as the vehicle longitudinal direction in a state in which the fixed part of the at least one of the motor unit support systems is fastened and fixed to the upper part of the motor unit. Thus, even if the reaction load is input to the motor unit in the vehicle longitudinal direction, the portion of the at least one of the motor unit support systems which is attached to the motor unit receives the reaction load in the axial direction of the first shaft-like fastening member. That is, since the axis of the first shaft-like fastening member extends in the vehicle longitudinal direction, the reaction load is less likely to be input to the first shaft-like fastening member in the shearing direction of the axis of the first shaft-like fastening member. This allows the at least one of the motor unit support systems to sufficiently absorb the reaction load when the reaction load is input to the motor unit in the vehicle longitudinal direction. Accordingly, the attachment rigidity of the motor unit support systems to the motor unit improves.

In an embodiment of the electric motor vehicle, the mounting shaft of at least one of the motor unit support systems is fastened and fixed to the cross member by a second shaft-like fastening member. An axial direction of the second shaft-like fastening member is the same as the vehicle longitudinal direction in a state in which the mounting shaft of the at least one of the motor unit support systems is fastened and fixed to the cross member.

This configuration contributes to easier detachment of the at least one of the motor unit support systems from the cross member, and contributes to improving the service.

Specifically, the cross member is fixed to the pair of right and left side frames so as to extend along the width of the vehicle. Thus, if the axial direction of the second shaft-like fastening member is the same as the vehicle width direction, the right and left side frames or the cross member itself may constitute an obstacle, hindering easier detachment of the second shaft-like fastening member. Assume that the axial direction of the second shaft-like fastening member is the same as the vehicle width direction. Thus, the at least one of the motor unit support systems cannot be detached from the cross member until the cross member is detached from the side frames and moved upward with the at least one of the motor unit support systems.

On the other hand, relatively few obstacles are provided in front of the cross member. Thus, if the axial direction of the second shaft-like fastening member is the same as the vehicle longitudinal direction, the second shaft-like fastening member may be easily detached even in a condition in which the cross member is attached and fixed to the side frames. Therefore, the axial direction of the second shaft-like fastening member is set to be the same as the vehicle longitudinal direction in a state in which the mounting shaft of the at least one of the motor unit support systems is fastened and fixed to the cross member. This configuration allows the at least one of the motor unit support systems to be detached from the cross member, without detaching the cross member from the side frames. This configuration contributes to improving the service.

In the electric motor vehicle, in which the mounting shaft is fastened and fixed to the cross member, recesses may be formed in portions of the cross member where the mounting shafts are provided, and the recesses are recessed in an opposite direction to the motor unit.

This configuration allows for easier placement of a tool at the fastening position of the second shaft-like fastening member, when detaching the mounting shaft of the motor unit support system from the cross member. This configuration contributes to easier detachment of the motor unit support system, and further improving the service.

In the electric motor vehicle, the upper part of the motor unit may serve as a mount for fastening and fixing the fixed part of one of the motor unit support systems. The mount may include: a first part fastened to the fixed part by the first shaft-like fastening member; a second part extending from a portion of the first part opposite to the fixed part, in the vehicle longitudinal direction.

This configuration improves the resistance to the reaction load, when the motor unit support system receives the reaction load.

Advantages of the Invention

As described above, according to the present disclosure, a fixed part of at least one of a pair of right and left motor unit support systems for mounting and supporting a motor unit on a cross member is fastened and fixed to an upper part of the motor unit by a first shaft-like fastening member. An axial direction of the first shaft-like fastening member is the same as a vehicle longitudinal direction in a state in which the fixed part of the at least one of the motor unit support systems is fastened and fixed to the motor unit. Thus, even if slip grip occurs and the reaction load is input to the motor unit in the vehicle longitudinal direction, the fixed part of the at least one of the motor unit support systems receives the reaction load in the axial direction of the first shaft-like fastening member. As a result, the attachment rigidity of the motor unit support systems to the motor unit improves.

DESCRIPTION OF EMBODIMENT

An exemplary embodiment will now be described in detail with reference to the drawings.

Figure 1:
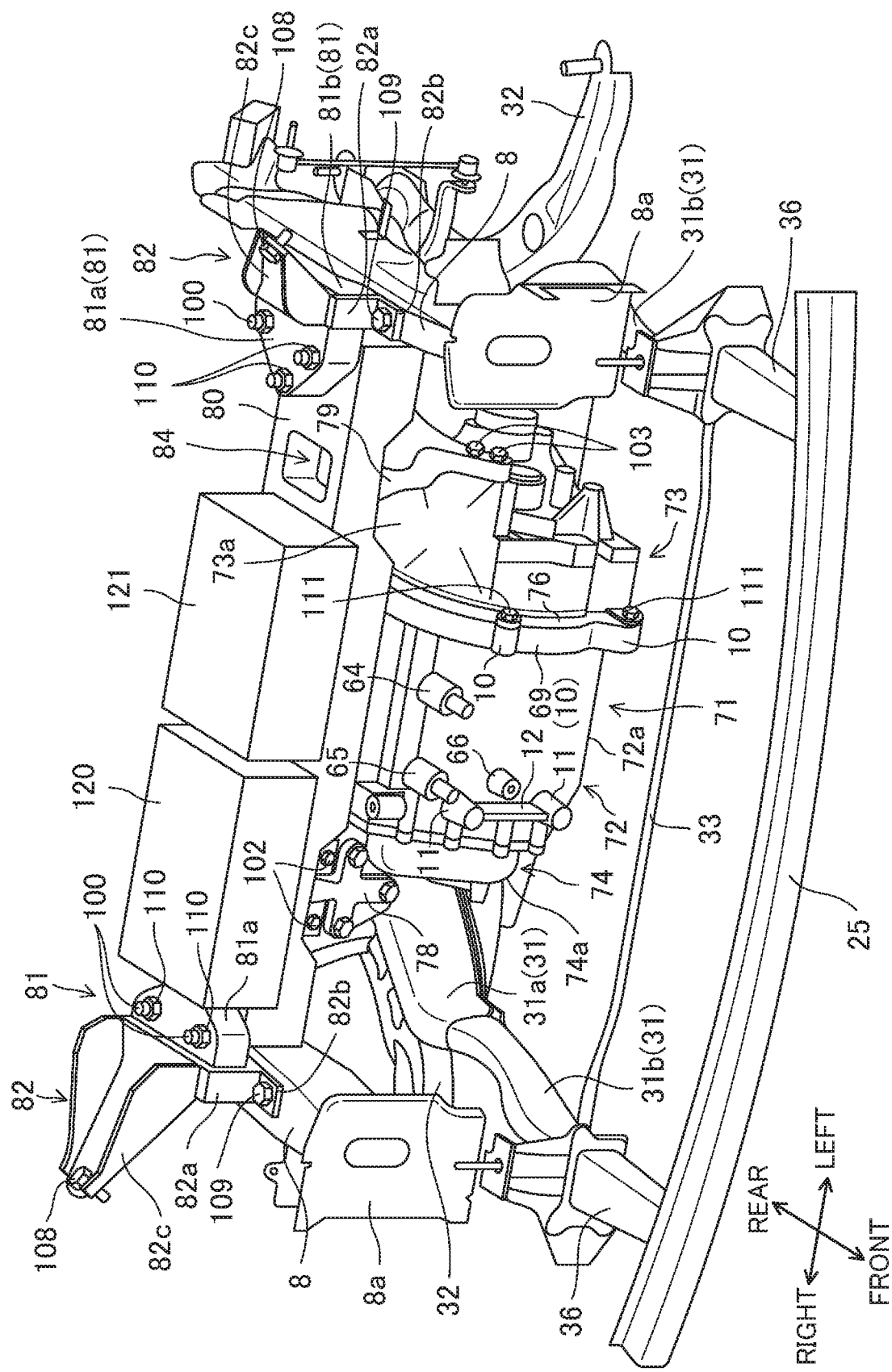
FIG. 1 is a perspective view illustrating a configuration of a power unit in a motor compartment located at the front of an electric motor vehicle according to an exemplary embodiment, as seen from above and the left front of the vehicle.
Figure 2:
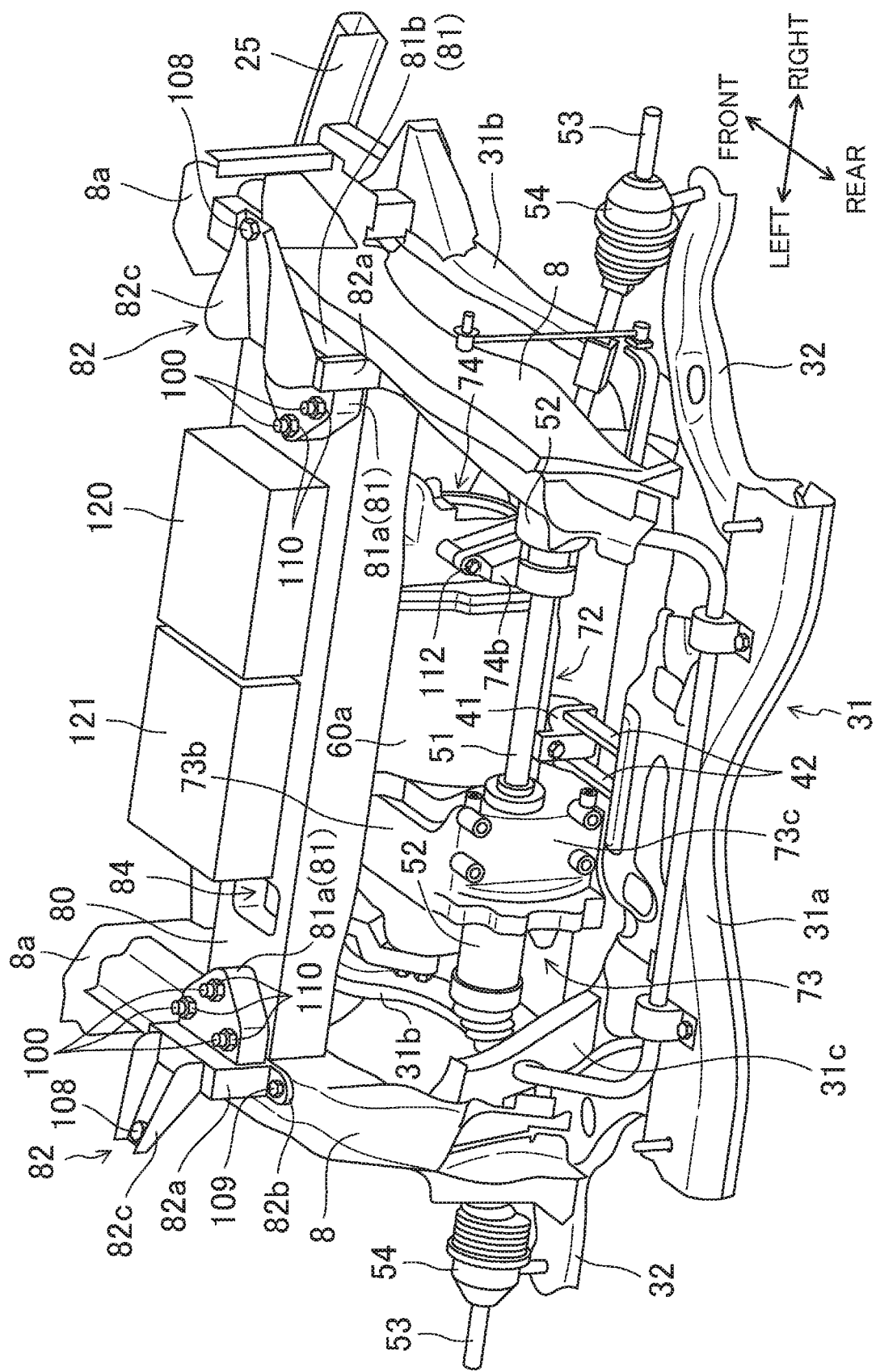
FIG. 2 is a perspective view illustrating the configuration of the power unit in the motor compartment located at the front of the electric motor vehicle, as seen from above and the right rear of the vehicle.

FIGS. 1 and 2 illustrate a configuration of a motor unit 71 in a motor compartment. The motor compartment is located at the front of an electric motor vehicle (which is an electric vehicle in this embodiment, and hereinafter will be simply referred to as a "vehicle") according to the exemplary embodiment. FIG. 1 illustrates the front of the vehicle around the motor unit 71, as seen from above and the left front of the vehicle. FIG. 2 illustrates the front of the vehicle around the motor unit 71, as seen from above and the right rear of the vehicle. The front, rear, left, right, above, and below with respect to the vehicle will be simply referred to as "front," "rear," "left," "right," "above," and "below," respectively.

A pair of right and left front side frames 8 are disposed at both ends of the motor compartment in the vehicle width direction. The front side frames 8 extend in the longitudinal direction of the vehicle. The motor unit 71 for driving the vehicle is disposed between these right and left front side frames 8. Each of the front side frames 8 has, at the rear, an incline in which the height of the front side frame 8 is gradually decreased toward the rear. A dash panel (not shown) as a partition between the motor compartment and a cabin is provided in a longitudinal position corresponding to the incline.

Flanges 8a are formed at the front ends of the right and left front side frames 8. The flanges 8a are fastened to the rear ends of crush cans (not shown), whose front ends are connected to a bumper beam.

At substantially the same longitudinal position as the inclines of the right and left front side frames 8, a suspension cross member 31 extends along the width of the vehicle, and supports right and left front wheels (not shown) at both the right and left ends. The suspension cross member 31 includes a main body 31a and right and left front extensions 31b. The main body 31a extends along the width of the vehicle. The right and left front extensions 31b extend forward from the front edges of both the right and left ends of the main body 31a. At both the right and left rear ends of the main body 31a, front wheel suspension arms 32 are mounted and supported, via which the front wheels are supported by the suspension cross member 31. At both the right and left front ends of the main body 31a, upper extensions 31c (see FIG. 2) extend upward and outward in the vehicle width direction. The right and left upper extensions 31c are fixed to the lower surfaces of the right and left front side frames 8, respectively. Accordingly, the suspension cross member 31 is coupled to the right and left front side frames 8.

The front ends of the lower surfaces of the right and left front extensions 31b are connected through a connecting cross member 33, which extends along the width of the vehicle. At the front ends of the front extensions 31b, a stiffener 25 which protrudes forward to protect pedestrians is fixed via coupling members 36. Disposed between the stiffener 25 and the connecting cross member 33 is an in-vehicle component such as a radiator for cooling water passing through a water jacket 63, which will be described later.

The motor unit 71 is obtained by integrally coupling a motor 72 and a transaxle 73 together such that the motor 72 and the transaxle 73 are aligned along the width of the vehicle. The transaxle 73 includes a power transmission mechanism (a deceleration mechanism and a differential mechanism) for transmitting a driving force of the motor 72 to the front wheels. The motor unit 71 is disposed at the front of the vehicle so that the axis of the motor unit 71 as a whole extends along the width of the vehicle. That is, the motor 72 is disposed at the front of the vehicle so that a motor output shaft 61a extends along the width of the vehicle. In this embodiment, the transaxle 73 is located at the left side of the motor 72.

The motor 72 includes a rotor 61 and a stator 62, which are disposed in a motor housing 72a. The rotor 61 is formed by fixing a rotor core 61b for holding a permanent magnet around the motor output shaft 61a. The motor output shaft 61a is coaxial with the motor housing 72a and extends along the width of the vehicle. On the other hand, the stator 62 is disposed on the inner surface of the motor housing 72a along the circumference of the motor housing 72a to cover the periphery of the rotor core 61b. A coil is wound around the stator 62.

In the motor housing 72a, the water jacket 63 is formed, through which the cooling water for cooling the motor 72 flows. The water jacket 63 is formed in a circumferential wall 72b of the motor housing 72a in a predetermined area in the width of the vehicle over the entire circumference of the motor housing 72a.

Figure 4:
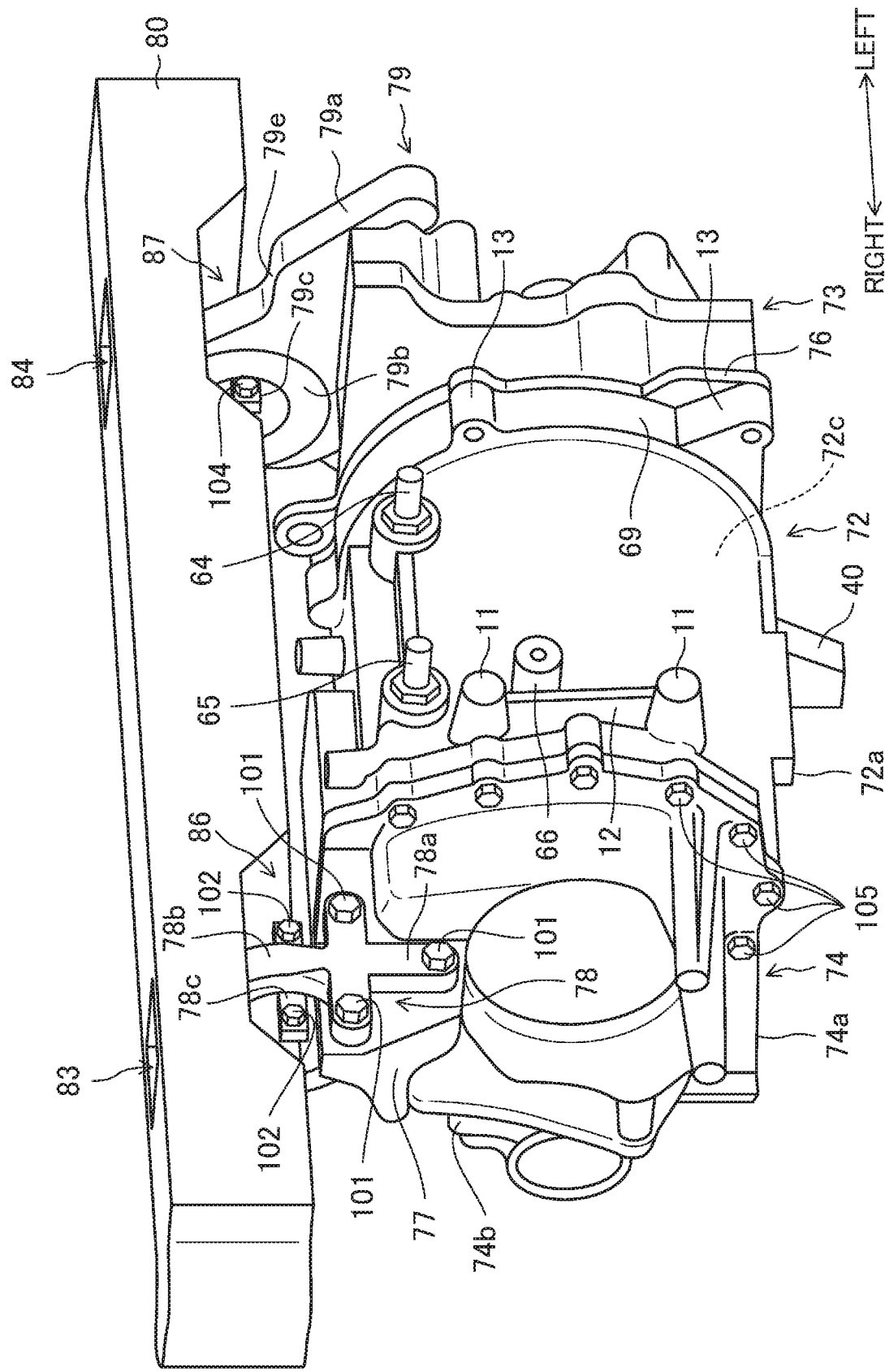
FIG. 4 is a perspective view of the power unit as seen from the right front of the vehicle.
Figure 5:
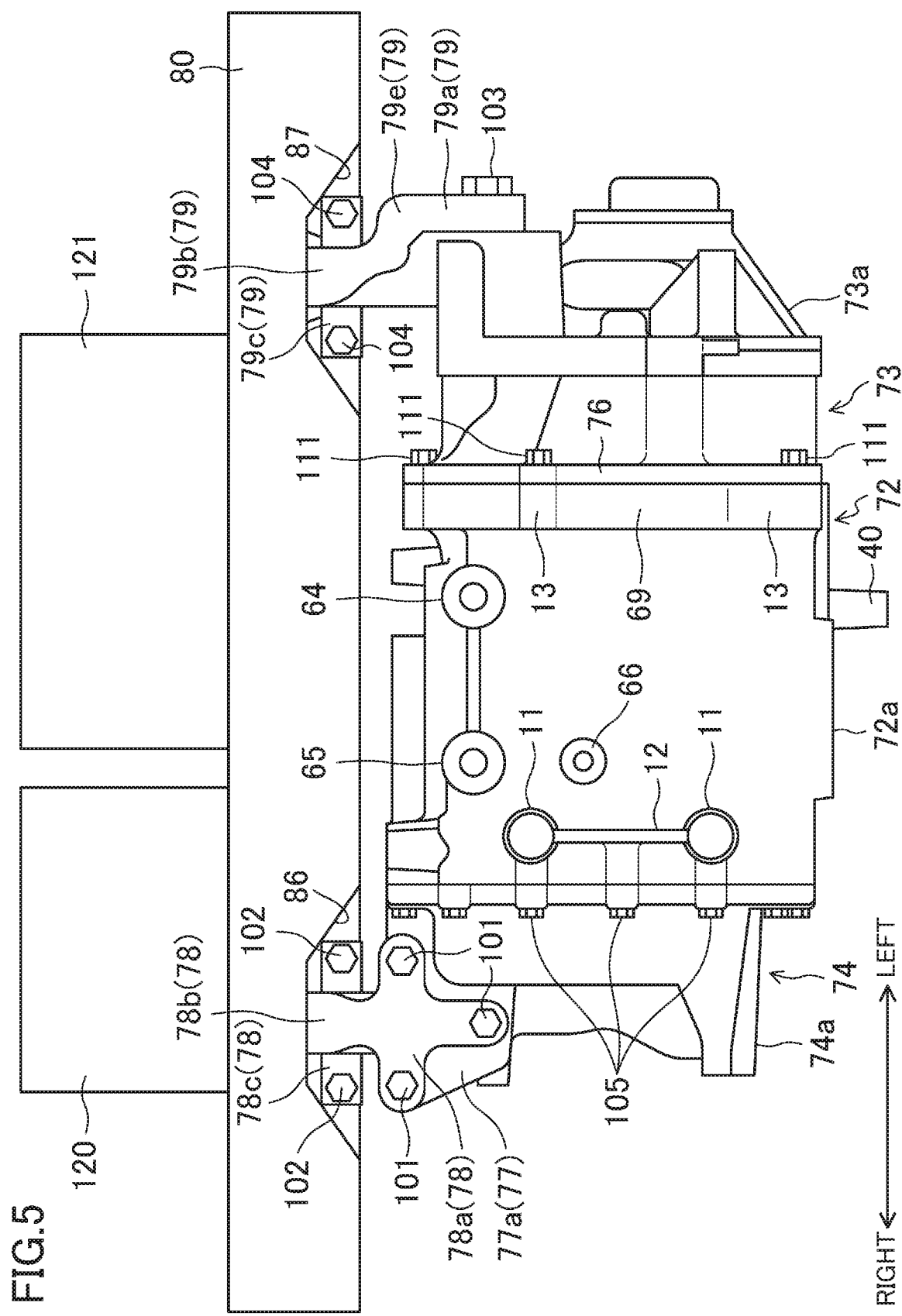
FIG. 5 is a front view of the power unit as seen from the front of the vehicle.

As shown in FIGS. 1, 4 and 5, an inlet 64 and an outlet 65 are provided at the front of the motor housing 72a. The inlet 64 allows the cooling water to flow into the water jacket 63. The outlet 65 allows the cooling water, which has passed through the water jacket 63, to flow out of the water jacket 63. In this embodiment, the inlet 64 is located on the left, and the outlet 65 is located on the right.

At the front of the motor housing 72a, a sensor port 66 is formed to insert, into the water jacket 63, a water temperature sensor that detects the temperature of the cooling water flowing through the water jacket 63.

As shown in FIGS. 1, 4, and 5, two bosses 11 and a rib 12 are provided at the front of the motor housing 72a at the right (i.e., the left in FIGS. 1, 4, and 5) of the sensor port 66. The rib 12 connects the two bosses 11 together. The two bosses 11 and the rib 12 are provided for the following purpose. That is, when collision occurs at the front of the vehicle and the in-vehicle component disposed in front of the motor 72 move toward the rear of the vehicle, the in-vehicle component does not come into direct contact with a portion of the circumferential wall 72b (see FIG. 3) which is provided with the water jacket 63.

Figure 3:
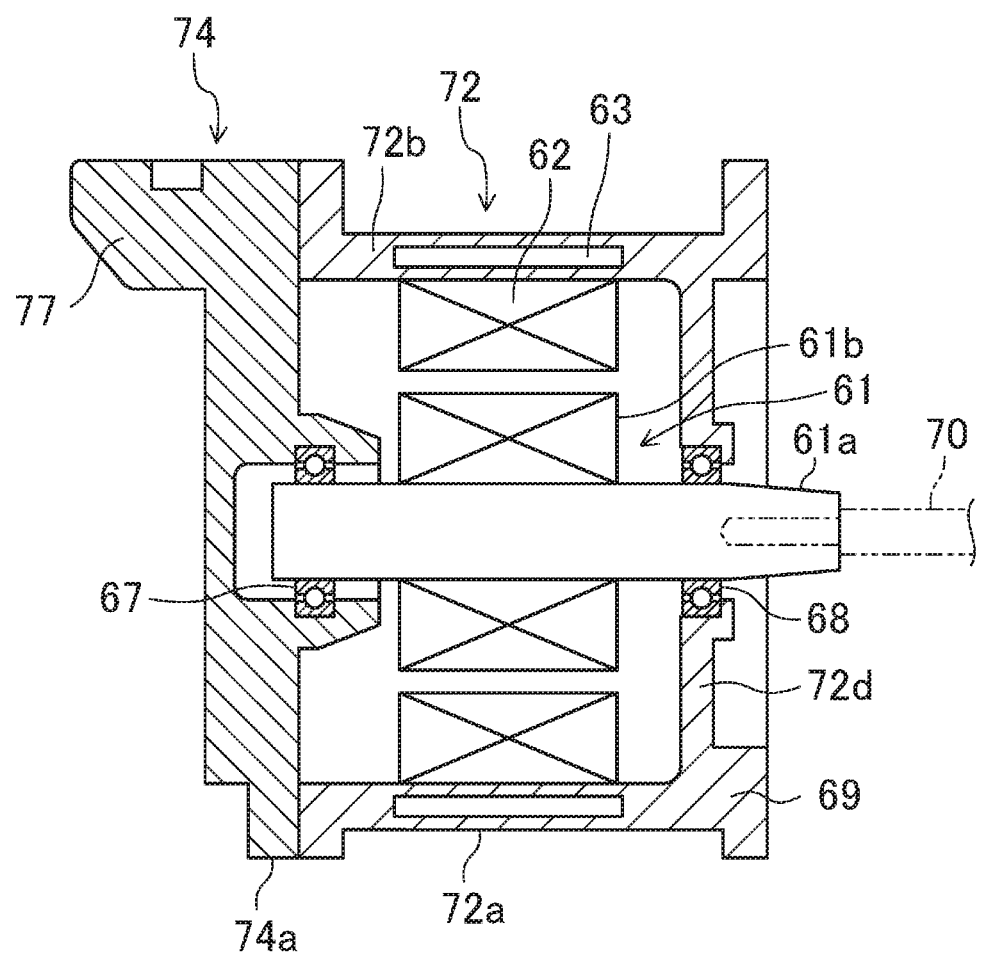
FIG. 3 is a cross-sectional view of a motor taken along the width of the vehicle, as seen from the front of the vehicle.
Figure 6:
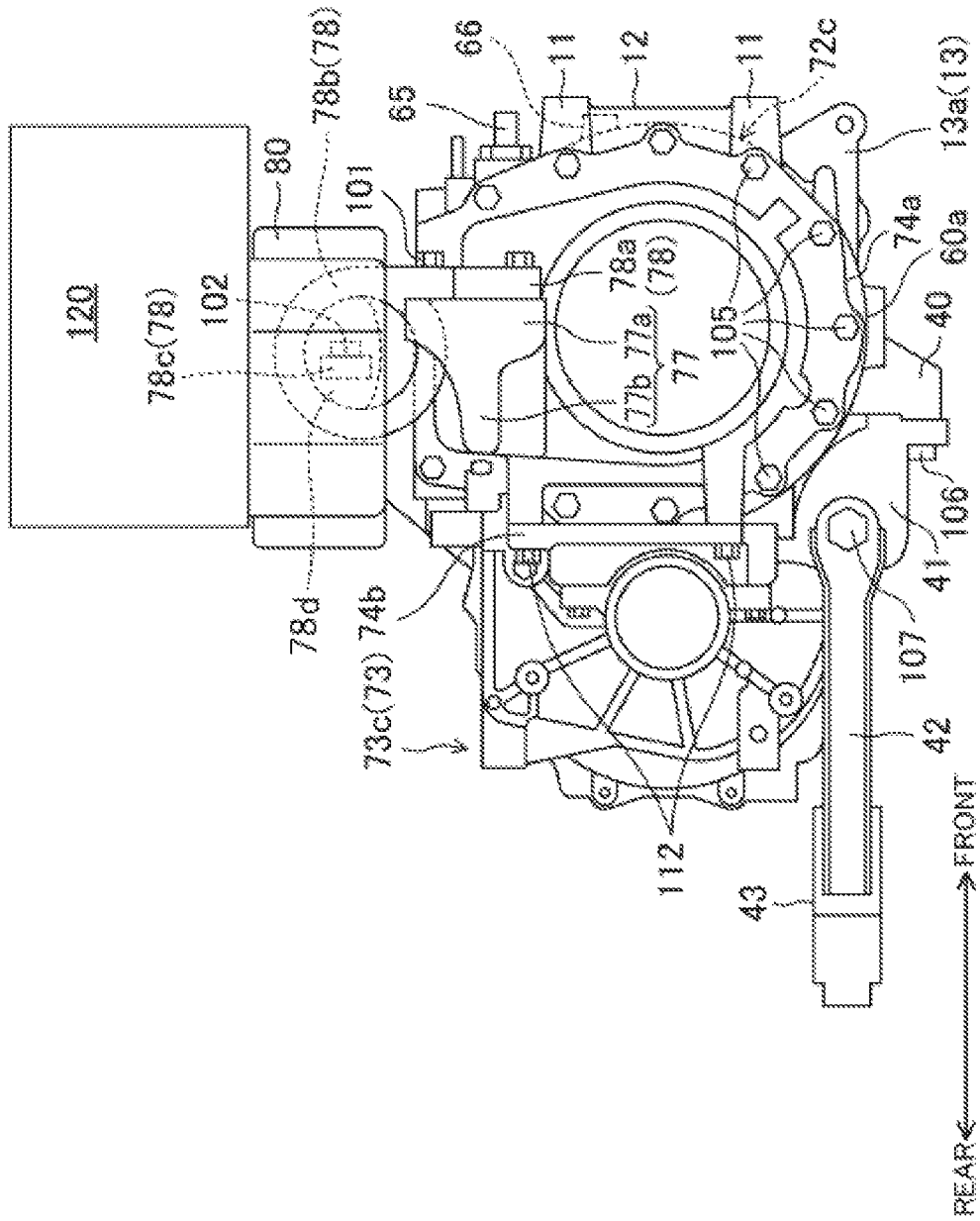
FIG. 6 is a right-side view of the power unit as seen from the right of the vehicle.

As shown in FIG. 3, the motor unit 71 has a closing member 74 for closing an opening on the right of the motor housing 72a at the right end (i.e., opposite to the transaxle 73, and at the left end in FIG. 3) of the motor 72. As shown in FIGS. 4 and 6, the closing member 74 is fixed to the peripheral edge of the opening on the right of the motor housing 72a with a plurality of bolts 105. At the left end of the closing member 74, a bearing 67 is provided, which rotatably supports the right end of the motor output shaft 61a.

On the other hand, the left end (i.e., the right end in FIG. 3) of the motor output shaft 61a is rotatably supported by a bearing 68 provided at the left end of the motor housing 72a. The motor output shaft 61a is connected to an input shaft 70, which is indicated by a two-dot chain line in FIG. 3, of the deceleration mechanism of the transaxle 73. The input shaft 70 extends along the width of the vehicle in a section 73b of an axle housing 73a, which will be described later, of the transaxle 73. The section 73b houses the deceleration mechanism.

The transaxle 73 includes the axle housing 73a. The right end of the axle housing 73a is coupled to the left end of the motor housing 72a with bolts 111. The right end part of the axle housing 73a serves as a joint flange 76 with a diameter larger than the left side. On the other hand, the left end part of the motor housing 72a serves as a joint flange 69 with a diameter larger than the right side. The joint flanges 69 and 76 are coupled together with the bolts 111 at two, upper and lower joints 13, thereby coupling the axle housing 73a to the motor housing 72a.

The axle housing 73a includes the section 73b (see FIGS. 2 and 7) housing the deceleration mechanism, and a section 73c (see FIGS. 2 and 7) housing the differential mechanism. The driving force of the motor 72 is transmitted from the deceleration mechanism to the differential mechanism. The section 73c is located behind the section 73b. As shown in FIG. 2, two joint shafts 51 as output shafts of the differential mechanism of the transaxle 73 (i.e., output shafts of the motor unit 71) extends from both the right and left side surfaces of the section 73c along the width of the vehicle. In FIG. 2, the section 73c overlaps and hides the left joint shaft 51. That is, the joint shafts 51 extend along the width of the vehicle at the rear of the motor unit 71. The right joint shaft 51 is divided into an inner part and an outer part by a constant speed joint 52 disposed in an intermediate portion of the right joint shaft 51. The outer part is connected to a right drive shaft 53, which is connected to the right front wheel, via a constant speed joint 54. Similarly, the left joint shaft 51 is divided into an inner part and an outer part by a constant speed joint 52 disposed in an intermediate portion of the left joint shaft 51. The outer part 51b is connected to a left drive shaft 53, which is connected to the left front wheel, via a constant speed joint 54. Accordingly, the shaft formed by the right and left joint shafts 51, the right and left constant speed joints 52 and 54, and the right and left drive shafts 53 serves as a wheel drive shaft.

The right end of the inner part 51a of the right joint shaft 51 (i.e., the vicinity of the associated constant speed joint 52) is rotatably supported by a shaft support bracket 74b, which is provided at the lower rear of the closing member 74. The shaft support bracket 74b is attached and fixed to the lower rear of the closing member 74 with two bolts 112 (see FIG. 6 for the bolt 112 below the right joint shaft 51).

Above the motor unit 71, at substantially the same height as the right and left front side frames 8, an upper cross member 80 extends along the width of the vehicle.

As shown in FIGS. 1 and 2, both ends of the upper cross member 80 in the vehicle width direction are fixed to the right and left front side frames 8 via motor unit-side brackets 81 and vehicle body-side brackets 82. Accordingly, the ends are mounted on and supported by the right and left front side frames 8, respectively. That is, the upper cross member 80 corresponds to a cross member disposed above the motor 72, and fixed to the pair of right and left side frames 8 so as to extend along the width of the vehicle.

Figure 8:
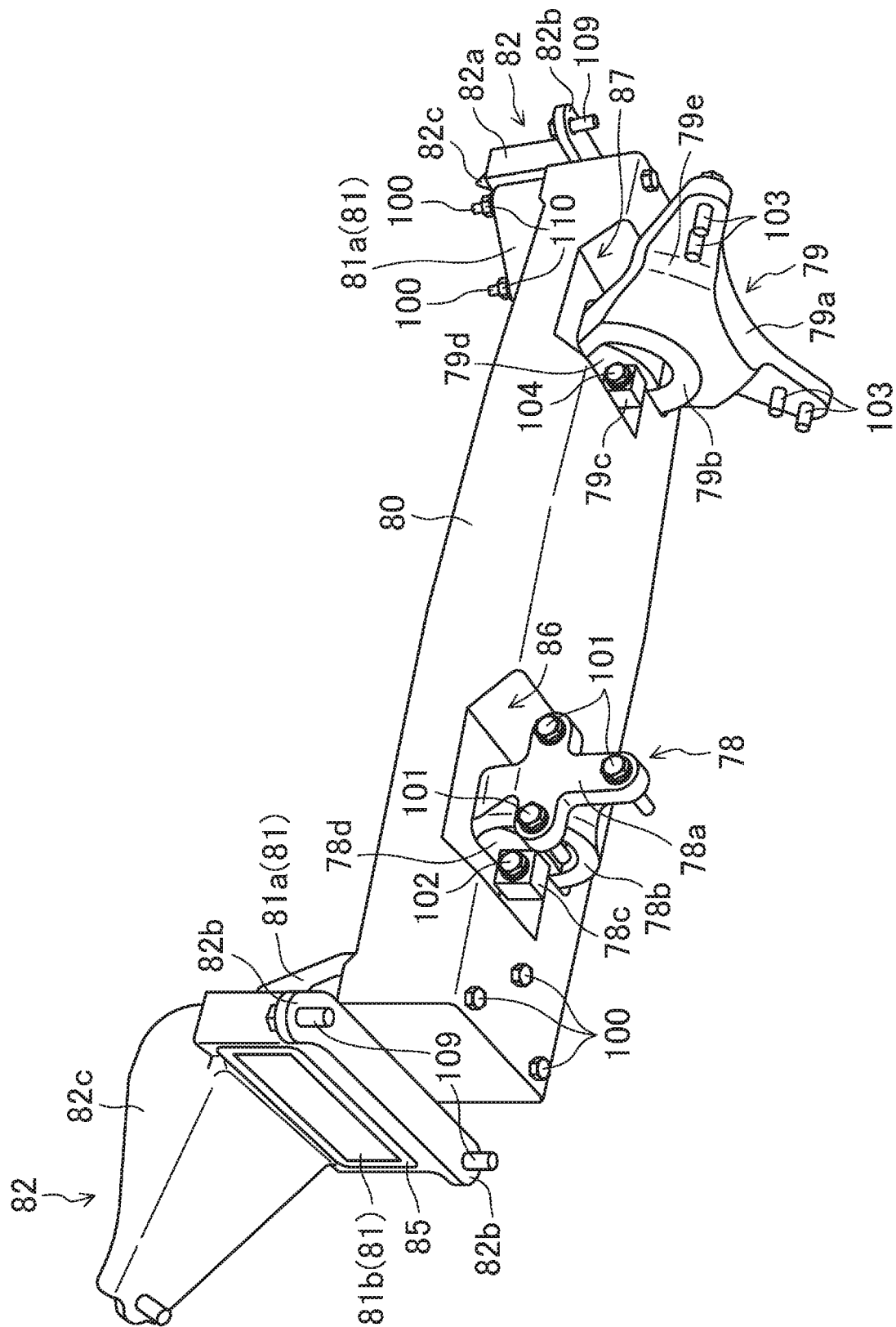
FIG. 8 is a perspective view of an upper cross member as well as a power unit-side bracket, a vehicle body-side bracket, and a pair of right and left motor unit support systems, which are attached to the upper cross member, as seen from below and the right front of the vehicle.

As shown in FIGS. 1, 2, and 8, each of the motor unit side brackets 81 includes a fixed part 81a and a fitted part 81b. Each fixed part 81a is in the shape of substantially a pentagon as seen from above. The fitted parts 81b are fitted in frames 82a provided in the respective vehicle body-side brackets 82 (see FIG. 1 for the left fitted part 81b, and FIGS. 2 and 8 for the right fitted part 81b). The fixed parts 81a of the right and left motor unit-side brackets 81 are respectively fixed to the right and left ends of the upper surface of the upper cross member 80 with three bolts 100 (i.e., six bolts 100 in total on the right and left) and three nuts 110 (i.e., six nuts 110 in total on the right and left). Specifically, the three bolts 100 are inserted upward at each of the right and left ends of the upper cross member 80. The shafts of the bolts 100, which protrude upward beyond the upper surface of the upper cross member 80, are inserted upward from below into bolt holes, which are formed in the associated fixed part 81a. The nuts 110 are attached to the portions of the bolt shafts, which protrude upward beyond the upper surfaces of both the fixed parts 81a. Both the fixed parts 81a are fixed to the upper surface of the upper cross member 80. Each of the fitted parts 81b of the right and left motor unit-side brackets 81 is in the shape of a cuboid and integral with the associated fixed part 81a. In a state in which both the fixed parts 81a are fixed to the upper cross member 80, both the fitted parts 81b are located outside the upper cross member 80 in the vehicle width direction.

Each of the right and left vehicle body-side brackets 82 includes the frame 82a and side frame-side fixing parts 82b. The fixing parts 82b are for fixing the vehicle body-side brackets 82 to the upper surfaces of the front side frames 8. As shown in FIG. 8, each frame 82a is like a rectangular frame, as seen transversely. The side frame-side fixing parts 82b are provided at the front and rear of each vehicle body-side bracket 82. The side frame-side fixing part 82b on the front side extends forward from the lower front end of the associated frame 82a. On the other hand, the side frame-side fixing part 82b on the rear side extends rearward from the lower rear end of the associated frame 82a. As shown in FIGS. 1 and 2, these side frame-side fixing parts 82b are fixed to the upper surfaces of the front side frames 8 with bolts 109. Accordingly, the vehicle body-side bracket 82 on the left side is fixed to the upper surface of the left front side frame 8, while the vehicle body-side bracket 82 on the right side is fixed to the upper surface of the right front side frame 8.

The fitted part 81b of the left motor unit-side bracket 81 is fitted into the frame 82a of the left vehicle body-side bracket 82 via a rubber bush 85 (i.e., see FIG. 1 for the left rubber bush 85). The fitted part 81b of the right motor unit-side bracket 81 is fitted into the frame 82a of the right vehicle body-side bracket 82 via a rubber bush 85 (i.e., see FIG. 8 for the right bush 85). Accordingly, the upper cross member 80 is mounted on and supported by the right and left front side frames 8.

Apron-side fixed parts 82c extending obliquely upward from the upper ends of the frames 82a of the right and left vehicle body-side brackets 82 and outward in the vehicle width direction. An upper end of the apron side-fixed part 82c of the left vehicle body-side bracket 82 is fixed, with a bolt 108, to an apron member (not shown) provided on the left. An upper end of the apron side-fixed part 82c of the right vehicle body-side bracket 82 is fixed, with a bolt 108, to an apron member (not shown) provided on the right.

Turning to FIG. 4, see two portions of the right and left ends of the upper cross member 80, which are located, in the vehicle width direction, inside the fixed parts 81a of the right and left motor unit-side brackets 81. In one of the two portions, which is farther from the transaxle 73 (i.e., on the right), a motor-side through hole 83 is formed to dispose a mounting bracket 78b of a motor unit support system 78 at the motor 72 out of a pair of right and left motor unit support systems 78 and 79, which will be described later. In the other portion, which is closer to the transaxle 73 (i.e., on the left), an axle-side through hole 84 is formed to dispose a mounting bracket 79b of the motor unit support system 79 at the transaxle 73 out of the pair of right and left motor unit support systems 78 and 79.

An inverter 120 and an in-vehicle charger 121 are mounted on the upper cross member 80.

The inverter 120 converts DC power from a main battery (not shown) to AC power, and supplies the AC power to the motor 72. The inverter 120 includes an inverter case 120a in the shape of a rectangular box, and an inverter circuit housed in the inverter case 120a. The inverter 120 is located in the motor unit 71 above the region extending from the motor 72 to the closing member 74. The inverter 120 is connected to the main battery by a power cable.

The in-vehicle charger 121 receives power from a power source (e.g., a household power supply of 100 V or 200 V) outside the vehicle, and charges the main battery. The in-vehicle charger 121 includes a charger case 121a in the shape of substantially a rectangular box like the inverter 120, and a charging circuit housed in the charger case 121a. The in-vehicle charger 121 is located in the motor unit 71 above the region extending from the motor 72 to the joint flanges 69 and 76. The in-vehicle charger 121 is connected to the main battery by a power cable.

Figure 7:
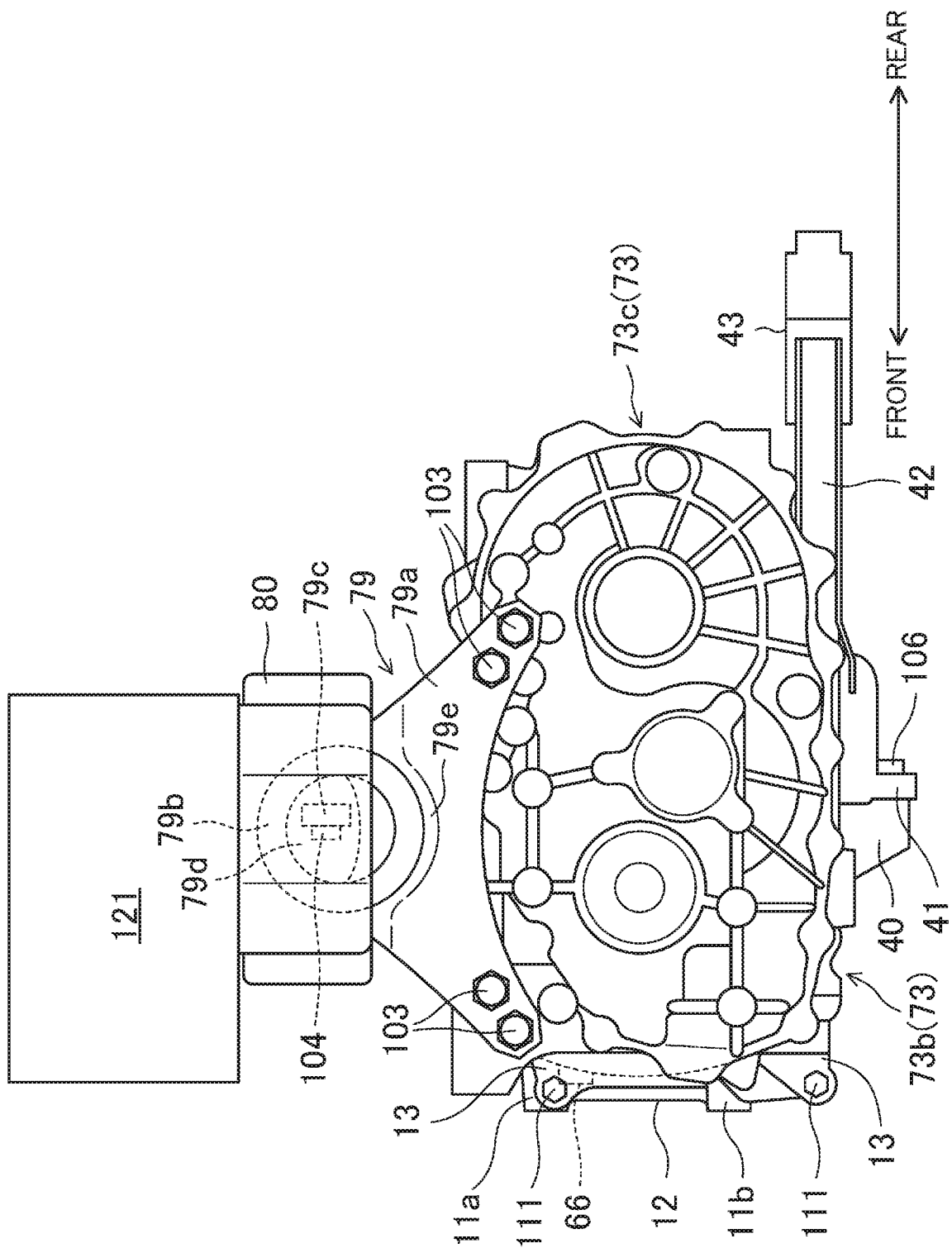
FIG. 7 is a left-side view of the power unit as seen from the left of the vehicle.

As shown in FIGS. 6 and 7, the longitudinal sizes of the inverter 120 and the in-vehicle charger 121 are larger than the width of the upper cross member 80 in the longitudinal direction of the vehicle. When the inverter 120 and the in-vehicle charger 121 are mounted on the upper cross member 80, the front end parts of the inverter 120 and the in-vehicle charger 121 protrude more forward than the front end part of the upper cross member 80.

The motor unit 71 including the motor 72 and the transaxle 73 is mounted on and supported by the upper cross member 80 by the pair of right and left motor unit support systems 78 and 79. That is, the motor unit 71 is supported by the right and left front side frames 8 via the upper cross member 80. Now, a configuration for mounting and supporting the motor unit 71 on the upper cross member 80 will be described.

First, a support structure at the motor 72 will be described. As shown in FIGS. 4 to 6, a mount 77 protruding toward the right is integrally formed on an upper portion of the closing member 74 of the motor unit 71. The mount 77 includes a front part (i.e., a first part) 77a and an extension (i.e., a second part) 77b. The front part 77a is located relatively at the front. The extension 77b extends rearward from a vertically intermediate portion of the rear of the front part 77a.

A fixed part 78a of the motor unit support system 78 at the motor 72 is fastened and fixed to the front part 77a of the mount 77 with three first bolts (first shaft-like fastening members) 101. The fixed part 78a is in substantially a T-shape as seen from the front. The first bolts 101 are fastened from the front at the ends of the T-shape. The axial directions of the first bolts 101 are the same as the longitudinal direction of the vehicle in a state in which the fixed part 78a is fastened and fixed to the mount 77.

As shown in FIGS. 6 to 8, the mounting bracket 78b, which is integrally formed with the fixed part 78a and in the shape of a ring as seen transversely, is provided behind and above the fixed part 78a. A rubber member 78d (see FIGS. 6 and 8) is provided in an upper position inside the mounting bracket 78b. As shown in FIG. 6, a mounting shaft 78c extending along the width of the vehicle is inserted into the rubber member 78d. As shown in FIG. 5, the mounting shaft 78c is fixed to the upper cross member 80 by fastening second bolts (second shaft-like fastening members) 102 at both the right and left ends of the mounting shaft 78c. The axial directions of the second bolts 102 are the same as the longitudinal direction of the vehicle in a state in which the mounting shaft 78c is fastened and fixed to the upper cross member 80. As described above, the mounting bracket 78b is connected to the upper cross member 80 via the rubber member 78d and the mounting shaft 78c. Accordingly, the end of the motor unit 71 at the motor 72 is connected to the upper cross member 80 via the motor unit support system 78 at the motor 72.

As shown in FIGS. 4, 5, and 8, the upper cross member 80 has a part below and in front of the motor-side through hole 83, specifically, a lower part in front of the position where the mounting shaft 78c is attached. This lower part serves as a motor-side recess 86, which is recessed in the shape of a trapezoid with a decreasing width in the vehicle width direction, as it goes upward from the lower end. The motor-side recess 86 is open at the front to allow for visual recognition of the second bolts 102 from the front, as shown in FIGS. 1, 4, and 5. The motor-side recess 86 allows for easier placement of a tool at the fastening positions of the second bolts 102, when attaching/detaching the mounting shaft 78c of the motor unit support system 78 at the motor 72 to/from the upper cross member 80.

Next, a support structure at the transaxle 73 will be described. As shown in FIG. 7, a fixed part 79a of the motor unit support system 79 at the transaxle 73 is fixed to the upper part of the axle housing 73a with four third bolts 103. The fixed part 79a is in an inverted V-shape as seen from the left, and includes front and rear fixed parts. The front fixed part is inclined forward and downward. The rear fixed part is inclined rearward and downward. Two of the third bolts 103 are fastened to the lower ends of the front and rear fixed parts, respectively. Accordingly, the motor unit support system 79 at the transaxle 73 is attached and fixed to the axle housing 73a. The axial directions of the third bolts 103 are the same as the vehicle width direction (i.e., the transverse direction) in a state in which the fixed part 79a is fastened and fixed to the axle housing 73a.

A connector 79e, which extends toward the right, is integrally formed with the upper part of the fixed part 79a, specifically, the upper parts of the front and rear fixed parts and the joint between the front and rear fixed parts. As shown in FIGS. 7 and 8, the mounting bracket 79b in the shape of a ring as seen transversely is formed at the right end of the connector 79e integrally with the connector 79e. A rubber member 79d (see FIGS. 6 and 8) is provided in an upper position inside the mounting bracket 79b. As shown in FIGS. 5 and 8, a mounting shaft 79c extending along the width of the vehicle is inserted into the rubber member 79d.

As shown in FIG. 5, the mounting shaft 79c is fixed to the upper cross member 80 by fastening fourth bolts 104 at both the right and left ends of the mounting shaft 79c. The axial directions of the fourth bolts 104 are the same as the longitudinal direction of the vehicle in a state in which the mounting shaft 79c is fastened and fixed to the upper cross member 80. As described above, the mounting bracket 79b is connected to the upper cross member 80 via the rubber member 79d and the mounting shaft 79c. Accordingly, the end of the motor unit 71 at the transaxle 73 is connected to the upper cross member 80 via the motor unit support system 79 at the transaxle 73.

As shown in FIGS. 4, 5, and 8, the upper cross member 80 has a part below and in front of the axle-side through hole 84, specifically, a lower part in front of the position where the mounting shaft 79c is attached. This lower part serves as an axle-side recess 87 like the part of the upper cross member 80 provided with the mounting shaft 78c of the motor unit support system 78 at the motor 72. The axle-side recess 87 is recessed in the shape of a trapezoid with a decreasing width in the vehicle width direction, as it goes upward from the lower end. Like the motor-side recess 86, the axle-side recess 87 is open at the front to allow for visual recognition of the fourth bolts 104 from the front, as shown in FIG. 5. The axle-side recess 87 allows for easier placement of a tool at the fastening positions of the fourth bolts 104, when attaching/detaching the mounting shaft 79c of the motor unit support system 79 at the transaxle 73 to/from the upper cross member 80.

In order to connect the motor unit 71 to the upper cross member 80 by the motor unit support systems 78 and 79, the mounting shafts 79c and 78c are first connected to the mounting brackets 78b and 79b via the rubber members 78d and 79d, respectively. Next, the fixed part 78a of the motor unit support system 78 at the motor 72 is fastened to the mount 77 by the three first bolts 101 to fix the fixed part 78a to the mount 77. On the other hand, the fixed part 79a of the motor unit support system 79 at the transaxle 73 is fastened to the axle housing 73a by the four third bolts 103 to fix the fixed part 79a to the left side wall of the axle housing 73a. As a result, the attachment of the motor unit support systems 78 and 79 to the motor unit 71 is complete.

Next, the upper cross member 80 is arranged as follows. The mounting bracket 78b of the motor unit support system 78 at the motor 72 is located inside the motor-side through hole 83 (see FIG. 4) of the upper cross member 80, and the mounting shaft 78c is located inside the motor-side recess 86. On the other hand, the mounting bracket 79b of the motor unit support system 79 at the transaxle 73 is located inside the axle-side through hole 84 (see FIG. 4) of the upper cross member 80, and the mounting shaft 79c is located inside the axle-side recess 87. After that, the mounting shaft 78c of the motor unit support system 78 at the motor 72 is fixed to the upper cross member 80 with the two second bolts 102. On the other hand, the mounting shaft 79c of the motor unit support system 79 at the transaxle 73 is fixed to the upper cross member 80 with the two fourth bolts 104. Accordingly, the motor unit 71 is connected to the upper cross member 80 via the motor unit support systems 78 and 79.

The order of attaching the upper cross member 80 to the motor unit 71 may be as follows. First, the motor unit support systems 78 and 79 are fixed to the upper cross member 80. Then, the fixed part 78a of the motor unit support system 78 is fixed to the mount 77, while the fixed part 79a of the motor unit support system 79 is fixed to the left side wall of the axle housing 73a.

The upper cross member 80 with the motor unit 71 is attached to the vehicle body (i.e., the right and left front side frames 8 and the right and left apron members) as follows. First, connected pairs of the motor unit-side bracket 81 and the vehicle body-side bracket 82 are disposed on the right and left. The side frame-side fixing part 82*b* of the left vehicle body-side bracket 82 is fixed to the left side frame 8 with the bolts 109, while the side frame-side fixing part 82*b* of the right vehicle body-side bracket 82 is fixed to the right side frame 8 with the bolts 109. At the same time, the apron-side fixed part 82*c* of the left vehicle body-side bracket 82 is fixed to the left apron member described above with the bolt 108, while the apron-side fixed part 82*c* of the right vehicle body-side bracket 82 is fixed to the right apron member described above with the bolt 108.

Then, the bolts 100 (see FIGS. 1 and 2) are inserted upward at both the right and left ends of the upper cross member 80. With the bolts 100 inserted, the upper cross member 80 with the motor unit 71 is disposed in the motor compartment from below so that the bolt shafts of the bolts 100 are inserted into the bolt holes of the fixed parts 81*a* of the motor unit-side brackets 81. After that, as shown in FIGS. 1 and 2, the nuts 110 are screwed upward onto the portions of the bolts 100, which protrude upward beyond the upper surfaces of the fixed parts 81*a*, to fix the fixed parts 81*a* to both the right and left ends of the upper cross member 80.

The process described above allows for attachment of the upper cross member 80 with the motor unit 71 to the right and left front side frames 8 and the right and left apron members. The motor unit 71 is mounted on and supported by the vehicle body (i.e., the right and left front side frames 8 and the right and left apron members) via the upper cross member 80.

The upper cross member 80 may be attached to the vehicle body in the following order. First, the upper cross member 80 with the motor unit 71 is disposed in the motor compartment described above. Then, connected pairs of the motor unit-side bracket 81 and the vehicle body-side bracket 82 are disposed from above at the right and left ends of the upper cross member 80. After that, the vehicle body-side brackets 82 are fixed to the front side frames 8 and the apron members described above, while the motor unit-side brackets 81 are fixed to the upper cross member 80.

As shown in FIGS. 4 to 7, a lower fixed part 40 protrudes downward at the lower left of the motor housing 72*a*. As shown in FIGS. 6 and 7, a lower bracket 41 is fixed to the lower fixed part 40 with bolts 106. The front ends of two torque rods 42 are fixed to the right and left rear parts of the lower bracket 41 with bolts 107 (see FIG. 6). The two torque rods 42 extend rearward from the lower bracket 41 and below the main body 31*a* of the suspension cross member 31. The rear ends of the two torque rods 42 are coupled together via a lower support 43. The lower support 43 is fixed to the main body 31*a* via a rubber bush and bolts. Accordingly, the motor unit 71 is supported by the vehicle body (i.e., the suspension cross member 31). Note that the two torque rods 42 may be wound around the rear of the lower support 43 to merge into a single member.

During driving the vehicle, what is called "slip grip" may occur, in which the wheels (the front wheels in this embodiment) grip the ground after idling. When the slip grip occurs and the wheels grip the ground, a reaction load is input from the wheels to the right and left drive shafts 53, the right and left constant speed joints 52 and 54, and the right and left joint shafts 51.

In this embodiment, the motor unit 71, on which the reaction load acts, is disposed such that the motor output shaft 61*a* of the motor unit 71 extends along the width of the vehicle. Thus, the reaction load acts in the longitudinal direction of the vehicle. In this embodiment, the motor unit 71 is mounted on and supported by the upper cross member 80 via the motor unit support systems 78 and 79. In such a case, it is necessary to avoid detachment of the motor unit 71 from the motor unit support systems 78 and 79 when the reaction load is input to the motor unit 71 in the longitudinal direction of the vehicle. That is, an improvement is necessary in the attachment rigidity of the motor unit support systems 78 and 79 to the motor unit 71.

In this embodiment, the motor unit support system 78 at the motor 72 is for mounting and supporting the motor 72 side of the motor unit 71 on the upper cross member 80. The motor unit support system 78 is fastened and fixed to the mount 77, which is integrally formed with the closing member 74 of the motor unit 71, with the three first bolts 101. The axial directions of the three first bolts 101 are the same as the longitudinal direction of the vehicle in a state in which the motor unit support system 78 is fastened and fixed to the mount 77. Even if the slip grip occurs and the reaction load is input to the motor unit 71 in the longitudinal direction of the vehicle, the portion of the fixed part 78*a* fastened to the mount 77 receives the reaction load in the axial directions of the first bolts 101. That is, the reaction load is less input to the first bolts 101 in the shearing directions of the bolt shafts of the first bolts 101. Thus, even if the load is input to the third bolts 103, which fix the fixed part 79*a* of the motor unit support system 79 at the transaxle 73 to the axle housing 73*a*, in the shearing directions of the bolt shafts, the motor unit support system 78 at the motor 72 sufficiently absorbs the reaction load. This configuration reduces the possibility of detachment of the motor unit 71 from the motor unit support systems 78 and 79. Accordingly, the attachment rigidity of the motor unit support systems 78 and 79 to the motor unit 71 is secured.

The mount 77, to which the fixed part 78*a* of the motor unit support system 78 at the motor 72 is fixed, is integrally formed with the closing member 74 of the motor unit 71. In addition, the mount 77 includes the front part 77*a* and the extension 77*b*, which extends rearward from a vertically intermediate portion of the rear of the front part 77*a*. The mount 77 has a relatively great length in the longitudinal direction of the vehicle. Even if the reaction load is input to the motor unit 71 in the longitudinal direction of the vehicle, it is less likely that the mount 77 is detached from the closing member 74. Accordingly, the fastening and fixture of the motor unit support system 78 at the motor 72 to the mount 77 increases the resistance to the reaction load applied to the motor unit support system 78 at the motor 72.

The mounting shaft 78*c* of the motor unit support system 78 at the motor 72 is fastened and fixed to the upper cross member 80 with the two second bolts 102. The axial directions of the second bolts 102 are the same as the longitudinal direction of the vehicle in a state in which the mounting shaft 78*c* is fastened and fixed to the upper cross member 80. This configuration allows the second bolts 102, in addition to the first bolts 101, to receive, in the axial directions, the reaction load input to the motor unit 71 in the longitudinal direction of the vehicle. The mounting shaft 79*c* of the motor unit support system 79 at the transaxle 73 is fastened and fixed to the upper cross member 80 with the two fourth bolts 104. The axial directions of the fourth bolts 104 are the same as the longitudinal direction of the vehicle in a state in which the mounting shaft 79*c* is fastened and fixed to the upper cross member 80. This configuration allows the fourth bolts 104 to receive, in the axial directions, the reaction load input to the motor unit 71 in the longitudinal direction of the vehicle. Accordingly, the attachment rigidity of the motor unit support systems 78 and 79 to the upper cross member 80 also improves.

The configuration which allows the first bolts 101 to receive the reaction load in the axial directions improves the resistance of each bolt to the reaction load, as compared with the case like the third bolts 103 receiving the reaction load in the shearing directions of the bolt shafts. A smaller number of bolts (i.e., the first bolts 101) is thus required to fasten and fix the motor unit support system (i.e., the motor unit support system 78 at the motor 72) to the motor unit 71.

In this embodiment, the axial directions of the second bolts 102 are the same as the longitudinal direction of the vehicle in a state in which the mounting shaft 78c is fastened and fixed to the upper cross member 80. This configuration allows for easier detachment of the motor unit support system 78 at the motor 72 from the upper cross member 80. Specifically, if the axial directions of the second bolts 102 extend along the width of the vehicle, for example, the right and left side frames 8 may constitute an obstacle in detaching the second bolts 102, hindering placement of a tool at the fastening positions of the second bolts 102. It is thus difficult to detach the motor unit support system 78 at the motor 72 until the upper cross member 80 is detached from the right and left side frames 8. On the other hand, relatively few obstacles are provided in front of the upper cross member 80. Thus, as in this embodiment, the axial directions of the second bolts 102 may be set to be the same as the longitudinal direction of the vehicle in a state in which the mounting shaft 78c is fastened and fixed to the upper cross member 80. This configuration allows for easier placement of a tool at the fastening positions of the second bolts 102, and hence the detachment of the second bolts 102 without detaching the upper cross member 80 from the right and left side frames 8. This configuration therefore contributes to easier detachment of the motor unit support system 78 at the motor 72 for, for example, checking the motor unit support system 78, and contributes to improving the service.

In this embodiment, the motor-side recess 86 is formed in the upper cross member 80, which makes it easier to place a tool at the fastening positions of the second bolts 102 in detaching the mounting shaft 78c of the monitor unit support system 78 at the motor 72. This configuration contributes to easier detachment of the motor unit support system 78 at the motor 72, and further improvement in the service.

The present disclosure is not limited to the embodiment described above, and may be modified within the scope of the claims.

For example, in the embodiment described above, the axial directions of the third bolts 103 are the same as the vehicle width direction in a state in which the fixed part 79a of the motor unit support system 79 at the transaxle 73 is fixed to the axle housing 73a. The configuration is not limited thereto. Like the first bolts 101, the axial directions of the third bolts 103 may also be the same as the longitudinal direction of the vehicle in a state in which the fixed part 79a is fixed to the transaxle 73.

In the embodiment described above, the second and fourth bolts 102 and 104 for fastening the mounting shafts 78c and 79c of the pair of right and left motor unit support systems 78 and 79, respectively, to the upper cross member 80 are inserted from the front to the rear. The second and fourth bolts 102 and 104 may be inserted from the rear to the front, as long as the axial directions of the second and fourth bolts 102 and 104 are the same as the longitudinal direction of the vehicle in a state in which the mounting shafts 78c and 79c are fastened and fixed to the upper cross member 80. The mounting shafts 78c and 79c may be fastened and fixed to the upper cross member 80 not only with the bolts but also with bolts and nuts.

In the embodiment described above, the left motor unit support system 79 (i.e., the system at the transaxle 73) of the pair of right and left motor unit support systems 78 and 79 is fixed to the axle housing 73a. The configuration is not limited thereto. The left motor unit support system 79 may be fixed to the motor housing 72a. In such a configuration, the left motor unit support system 79 may be advantageously fixed to the left end of the motor housing 72a so that the motor unit 72 is properly supported by the upper cross member 80.

An example in which the motor unit 71 includes the transaxle 73 has been described, but the configuration is not limited thereto. The motor unit 71 may not include the trans axle 73. In such a configuration, the left motor unit support system 79 (i.e., the system at the transaxle 73) may be advantageously fixed to the left end of the motor housing 72a so that the motor unit 72 is properly supported by the upper cross member 80.

The embodiments described above are merely preferred examples in nature, and the scope of present disclosure should not be interpreted in a limited manner. The scope of the technique disclosed herein is defined by the appended claims, and all variations and modifications belonging to a range equivalent to the range of the claims are within the scope of the technique disclosed herein.

INDUSTRIAL APPLICABILITY

The technique disclosed herein is useful as an electric motor vehicle including a motor unit which is disposed between a pair of right and left side frames such that a motor output shaft thereof extends along a width of the vehicle, and which serves as a power source for driving right and left wheels, wherein the motor unit is mounted on and supported by a cross member which is disposed above the motor unit and which is fixed to the pair of right and left side frames so as to extend in the width direction of the vehicle.

DESCRIPTION OF REFERENCE CHARACTERS

8 Side Frame
61a Motor Output Shaft
71 Motor Unit
72 Motor
77 Mount (Upper Part of Motor)
77a Front Part (First Part of Mount)
77b Extension (Second Part of Mount)
78 Motor Unit Support System (At Least One Motor Unit Support System)
78a Fixed Part
78b Mounting Bracket
78c Mounting Shaft
79 Motor Unit Support System
79a Fixed Part
79b Mounting Bracket
79c Mounting Shaft
80 Upper Cross Member (Cross Member)
101 First Bolt (First Shaft-Like Fastening Member)
102 Second Bolt (Second Shaft-Like Fastening Member)

The invention claimed is:
1. An electric motor vehicle comprising:
a motor unit which is disposed between a pair of right and left side frames such that a motor output shaft thereof extends along a width of the vehicle, and which serves as a power source for driving right and left wheels;

a cross member disposed above the motor unit, and fixed to the pair of right and left side frames to extend along the width of the vehicle; and a pair of right and left motor unit support systems for mounting and supporting the motor unit on the cross member, wherein each of the pair of right and left motor unit support systems includes:

a fixed part fixed to the motor unit; and a mounting shaft connected to the fixed part via a mounting bracket integrally formed with the fixed part, and the mounting shaft being fixed to the cross member, the fixed part of at least one of the pair of right and left motor unit support systems is fastened and fixed to an upper part of the motor unit by a first shaft-like fastening member, and an axial direction of the first shaft-like fastening member is the same as a vehicle longitudinal direction in a state in which the fixed part of the at least one of the motor unit support systems is fastened and fixed to the upper part of the motor unit, wherein the mounting shaft of at least one of the motor unit support systems is fastened and fixed to the cross member by a second shaft-like fastening member, and an axial direction of the second shaft-like fastening member is the same as the vehicle longitudinal direction in a state in which the mounting shaft of the at least one of the motor unit support systems is fastened and fixed to the cross member.

2. The electric motor vehicle of claim 1, wherein recesses are formed in portions of the cross member where the mounting shafts are provided, the recesses being recessed in an opposite direction to the motor unit.

3. The electric motor vehicle of claim 1, wherein the upper part of the motor unit serves as a mount where the fixed part of one of the motor unit support systems is fastened and fixed, and the mount includes:

a first part fastened to the fixed part by the first shaft-like fastening member; and a second part extending from a portion of the first part opposite to the fixed part, in the vehicle longitudinal direction.

* * * * *